United States Patent [19]

Terada et al.

[11] Patent Number: 5,436,733
[45] Date of Patent: Jul. 25, 1995

[54] IMAGE PROCESSING APPARATUS FOR COMBINING IMAGE DATA AND TEXTURE IMAGE DATA

[75] Inventors: Yoshihiro Terada; Kazuyasu Sasuga; Katuyuki Kouno; Kazuman Taniuchi; Masahiro Ishiwata, all of Kanagawa, Japan

[73] Assignee: Fuji Xerox Co. Ltd., Tokyo, Japan

[21] Appl. No.: 882,138

[22] Filed: May 13, 1992

[30] Foreign Application Priority Data

May 14, 1991 [JP] Japan .................. 3-107969

[51] Int. Cl.$^6$ .................. H04N 1/40; H04N 1/46
[52] U.S. Cl. .................. 358/448; 358/447; 358/537
[58] Field of Search .................. 358/445, 455, 456, 462, 358/463, 464, 465, 466, 450, 400, 500, 448, 447, 540, 537, 530, 520, 450, 443, 469; 364/395; 345/153, 154, 136, 137, 138; 395/130, 131

[56] References Cited

U.S. PATENT DOCUMENTS

| | | | |
|---|---|---|---|
| 4,958,217 | 9/1990 | Kimura | 358/538 |
| 4,965,745 | 10/1990 | Economy | 364/518 |
| 5,021,876 | 6/1991 | Kurita | 358/530 |
| 5,187,593 | 2/1993 | Kurita | 358/443 |

FOREIGN PATENT DOCUMENTS 62-32773 2/1987 Japan .
62-139081 6/1987 Japan .
64-23677 1/1989 Japan .

*Primary Examiner*—Edward L. Coles, Sr.
*Assistant Examiner*—Allan A. Esposo
*Attorney, Agent, or Firm*—Finnegan, Henderson, Farabow, Garrett & Dunner

[57] ABSTRACT

A texture image processing system for image processing apparatus comprises, first calculator for calculating a maximum value and a minimum value of texture image data; second calculator for calculating an average value and a gain value with employment of said maximum value and minimum value; and synthesizing processor for synthesizing texture image data by image picture data, this synthesizing processor synthesizing the texture image data with the image picture data by multiplying a difference between the texture image data and the average value by the gain value. Also, synthesizing processor synthesizes the texture image data with chromaticity information of the image picture data, or chromaticity information of the image picture data with predetermined chromaticity information, chromaticity information of the texture image data. With the above-described structures, both of hue and saturation in the image picture data are maintained, and also the synthesized texture image having no great brightness change over its entire region is obtained.

4 Claims, 7 Drawing Sheets

POSITION IN THE MAIN SCANNING DIRECTION

FIG. 3D

POSITION IN THE MAIN SCANNING DIRECTION

IMAGE PROCESSING APPARATUS FOR COMBINING IMAGE DATA AND TEXTURE IMAGE DATA

BACKGROUND OF THE INVENTION

1. Field of the Invention

The present invention relates to an image processing apparatus wherein after a color separated signal outputted from image reading means is converted into an equivalent color spatial signal, this equivalent color signal is converted into a color material signal of the image output means, and more specifically to a texture image processing system for synthesizing a texture image with an image picture.

2. Discussion of the Prior Art

A digital copying machine is constructed by an IIT (image input terminal) for reading an original; an IPS (image processing system) for processing the read-out image data; and an IOT (image output terminal) for outputting a copy by driving, for instance, a laser printer by the image data. In the IIT, image information of an original is derived by utilizing a CCD sensor as an analog electric signal in response to reflectivity, and this analog electric signal is converted into multi-graded digital image data. Then, various corrections, conversions, editing operations and the like are performed by processing the image data obtained from the IIT in the IPS. In the IOT, a dot image is outputted by turning ON/OFF the laser light of the laser printer in accordance with the image data processed by the IPS.

In such a digital copy machine, multi-graded image data may be outputted by way of the process of the IPS, depending upon its sort. For instance, in case of characters or the like, a sharp image whose edges have been emphasized may be obtained; in case of a half tone image such as a photograph, an image whose Moire' and dots have been removed and smoothened may be outputted; and also a color image whose definition has been adjusted with high reproducibility may be produced. Furthermore, such images that various edit operations, e.g., coloring, color conversion, trimming, shifting, synthesization, compression, enlargement and the like have been performed on an original, may be outputted. In the IIT, after the original has been read out by signals separated into three primary colors R (red), G (green) and B (blue), these read signals are converted into digital signals, and then these digital signals are converted into dot images of color materials such as Y (yellow), M (magenta), C (cyan) and K (black) which are superimposed with each other, whereby a color digital copying machine is constructed. As a consequence, in the color image processing apparatus such as color digital copying machines, the above-described color-material developers are employed, the scanning operation is repeated four times in conformity with the respective color material developing processes, and the full color image data on the read original are processed every scanning operation.

Figure 6:
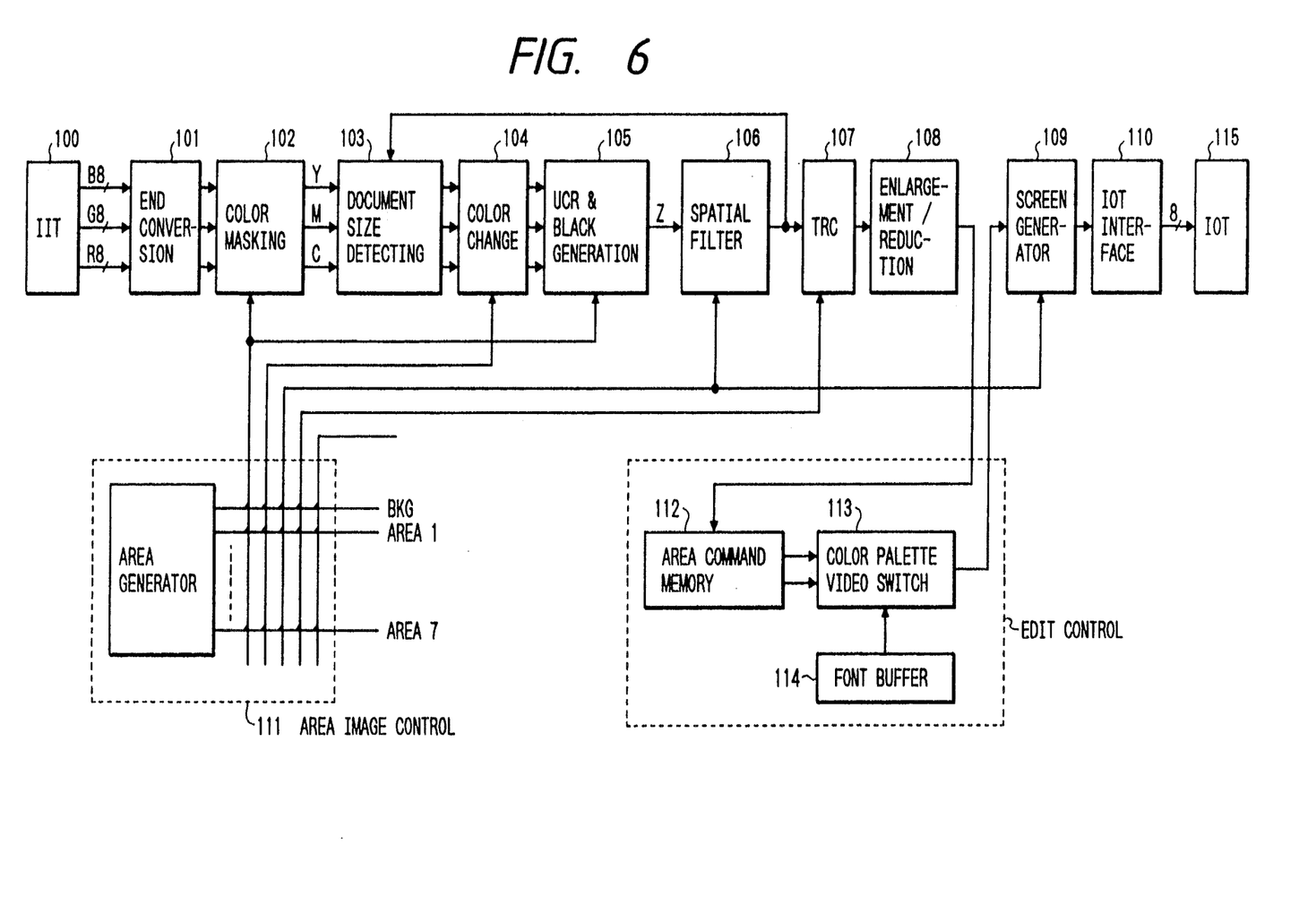
FIG. 6 is a diagram for showing an example of the construction of the conventional color digital copying machine.

An outline of the above-described color digital copying machine will now be explained with reference to one conventional color digital copying machine as proposed by Unexamined Japanese Patent Application (Kokai) Hei-2-223275. FIG. 6 represents an example of an arrangement for the conventional color digital copying machine.

In FIG. 6, an IIT 100 reads a color original to be color-separated into three light primary colors B, G, R with employment of a CCD line sensor, and converts these colors into digital image data. An IOT 115 performs exposing and developing operations by a laser beam, thereby to reproduce a color image. Then, circuitry from an END (Equivalent Neutral Density) converting circuit 101 to an IOT interface 110 which are present between the IIT 100 and the IOT 115 constitute an edit processing system (IPS: image processing system) for image data, convert the image data of B, G, R into color materials Y, M, C and also K, and output a color material signal corresponding to a developing color every developing cycle to the IOT 115.

In the IIT 100, with respect to the respective color data of B, G, R, 1 pixel is read out in a size of 16 dots/mm by employing a CCD sensor, and then the read data are outputted as 24 bits data (3 colors×8 bits 256 gradations). Since the CCD sensor having an upper surface on which B, G and R filters are mounted, and also a length of 300 mm with density of 16 dots/mm, performs a scanning operation of 16 lines/mm at a process speed of 90.5 mm/sec, the readout data are outputted at a speed of approximately 15M pixels/sec with respect to each color. The, in the IIT 100, analog data about B, G, R pixels are logarithm-converted, so that information on reflectivity is converted into information on density, and furthermore into digital data.

In the IPS, the color separated signals of B, G, R from the IIT 100 are inputted, various data processes are performed so as to improve color reproducibility, gradation reproducibility and definition reproducibility; and the color material signals of the development process colors are converted into ON/OFF signals which will then be outputted into the IOT. An END conversion module 101 adjusts (converts) the B, G, R signals into gray-balanced color signals, and a color masking module 102 converts the B, G, R signals to signals corresponding to color material amounts for Y, M, C by matrix-calculating these B, G, R signals. An original size detecting module 103 performs both of an original size detection during the prescanning operation and an erasing (frame erasing) process of platen colors during the original read scanning operation. A color converting module 104 executes a color conversion of the color which has been designated at a specific region in accordance with an area signal inputted from a region image control module. Then, an UCR (Under Color Removal) & black generating module 105 generates a proper amount of K to prevent color turbidity, reduces equivalent amounts of Y, M, C to this proper amount, and also gates signals obtained by removing the K signal and the under colors of Y, M, C in accordance with the respective signals of the monocolor mode and 4-full color mode. A spatial filter 106 corresponds to a nonlinear digital filter equipped with a function to recover a blurring phenomenon and a function to remove Moire'. A TRC (Tone Reproduction Control) module 107 executes a density adjustment, a contrast adjustment, a negative/positive inversion and a color balance adjustment and the like so as to improve reproducibility. A compression/enlargement process module 108 executes a compression/enlargement process along a horizontal scanning direction, and a compression/enlargement process along a vertical scanning direction is executed by adjusting a scanning speed of an original. A screen generator 109 converts the color material signals of process color representative of multi gradation into ON/OFF signals, namely binary signals in accordance with the gradation. The binary color material signals are outputted via the IOT interface module 110 to the IOT 115. Then, a region image control module 111 includes a region generating circuit and a switch matrix, whereas an edit control module includes an area command memory 112, a color pallet video switch circuit 113, a font buffer 114 and the like and performs various edit controls.

A area image control module 111 is so constructed that 7 rectangular regions and a priority order thereof is settable in the region generating circuit, and control information on the region is set to the switch matrix, depending upon the respective regions. The control information includes: modulation select information such as the color conversion, the color mode for selecting either the mono color mode or the full color mode, the photograph or character, select information of TRC, and select information of the screen generator, which is employed so as to control the color masking module 102, the color conversion module 104, the UCR module 105, the spatial filter 106 and the TRC module 107. It should be noted that the switch matrix is settable by a software.

The edit control module reads an original which is not a rectangle, but a circular graph, and can color a designated region whose shape is not limited by a designated color, in which a 4-bit area command is written into 4 plane memories, and edit commands of the respective points of the original are set by 4-bit form by way of the 4 plane memories.

In the above-described color digital copying machine, the edit functions may be widely utilized in the various fields. For instance, a design simulation may be carried out by synthesizing (texture synthesizing) a designed image with a structural texture pattern (fine structural pattern) such as a mesh by utilizing the synthesizing function. There is one case among them that a pattern and also a picture pattern are designed and the designed patterns are applied to a cloth. Under such a circumstance, there are different atmospheres when observing a pattern and a picture pattern designed on a completely white cloth, and when observing the pattern and the picture pattern designed on a mixture with a cloth and a mesh having the same material of this cloth. In other words, when design evaluation is performed, it is apparent that the atmosphere of the latter case may conduct realistic results, rather than in the latter case. Such a texture synthesization (synthesis) may be utilized in designing of patterns and picture patterns for walls of architecture and street planes.

As previously described, the texture synthesization with employment of the structural pattern is realized in such a manner that while paying an attention to the brightness signal, the texture image is split into an AC component with respect to as a boarder line, a certain value, for instance, an average value of the texture image; and the obtained AC component is either added to the image picture, or subtracted from the image picture. However, such a process may not be realized in a process, for instance, a transparent synthesizing process, that data on two image pictures are overlapped with each other.

Thus, in accordance with the transparent synthesizing processes for synthesizing two images stored in memories, a transparent picture is formed by alternately reading the image data from the memories to synthesize these read image data with each other (for instance, Unexamined Japanese Patent Applications (Kokai) Sho-62-139081 and Sho-64-23677); and also another transparent picture is produced by obtaining a logical sum of the image data on BGR (YMC), or obtaining an average value of the image data on two BGR (YMC) every pixel.

Also, there is another system to obtain synthesized images B', G' and R' from the following equations, assuming now that color image signals are B, G, R and a texture image signal is T:

$$B' = \frac{M}{M+N} B + \frac{N}{M+N} T \text{ where: } M + N = 1$$

$$G' = \frac{M}{M+N} G + \frac{N}{M+N} T$$

$$R' = \frac{M}{M+N} R + \frac{N}{M+N} T$$

Also, there is a further system (for instance, referring to Unexamined Japanese Patent Application Sho-62-32773) that after the texture image is compressed at a predetermined ratio, the compressed texture image is combined, or synthesized the color image, and then the synthesized image is reversely expanded at a compression ratio.

However, in these conventional systems, the synthesized images become flat or do not represent the texture, otherwise dark. Therefore, when the above-described equations are employed, the set values M and N must be changed in response to the texture, which requires skilled art. Also, there are other problems that shifts happen to occur in hue and saturation.

SUMMARY OF THE INVENTION

An object of the present invention is to obtain a synthesized image of texture without a great variation in brightness of an overall synthesized image, while maintaining hue and saturation. Another object of the present invention is capable of adjusting strengths of texture.

To this end, according to the present invention; a texture image processing system of an image processing apparatus wherein after a color separated signal outputted from image reading means has been converted into an equivalent color spatial signal, this equivalent color spatial signal is converted into a color material signal of the image output means, comprising: first calculating means for calculating a maximum value and a minimum value of texture image data; second calculating means for calculating an average value and a gain value with employment of said maximum value and minimum value; and synthesizing process means for synthesizing texture image data by image picture data, said synthesizing process means synthesizing the texture image data with the image picture data by multiplying a difference between the texture image data and the average value by the gain value.

Also, the synthesizing process means is characterized in that the synthesizing process means synthesizes the texture image data with brightness information, or synthesizes predetermined color information with chromaticity information of the image picture data, or synthesizes the chromaticity information of the texture image data with the chromaticity information of the image picture data.

In accordance with the texture image processing system for the image processing apparatus, since the image picture data is synthesized with the texture image data by multiplying the difference between the texture image data and the average value thereof by the gain value, the synthesized texture image data may be obtained in which there is no variation in the brightness of the overall image after such a synthesization while maintaining hue and saturation in the image picture data. Also, since the texture image data is synthesized with the brightness information about the image picture data, or predetermined chromaticity information and the chromaticity information about the texture picture data are synthesized with chromaticity information about the image picture data, the texture having chromaticity can be reflected on the synthesized image with the image picture data.

DETAILED DESCRIPTION OF PREFERRED EMBODIMENTS

Figure 1:
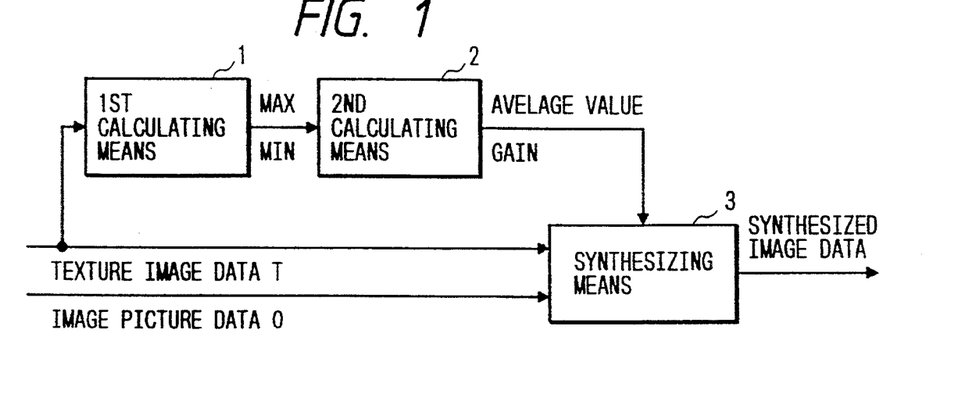
FIG. 1 is a diagram for explaining the texture image processing system of the image processing apparatus according to one embodiment of the present invention.
Figure 2A:
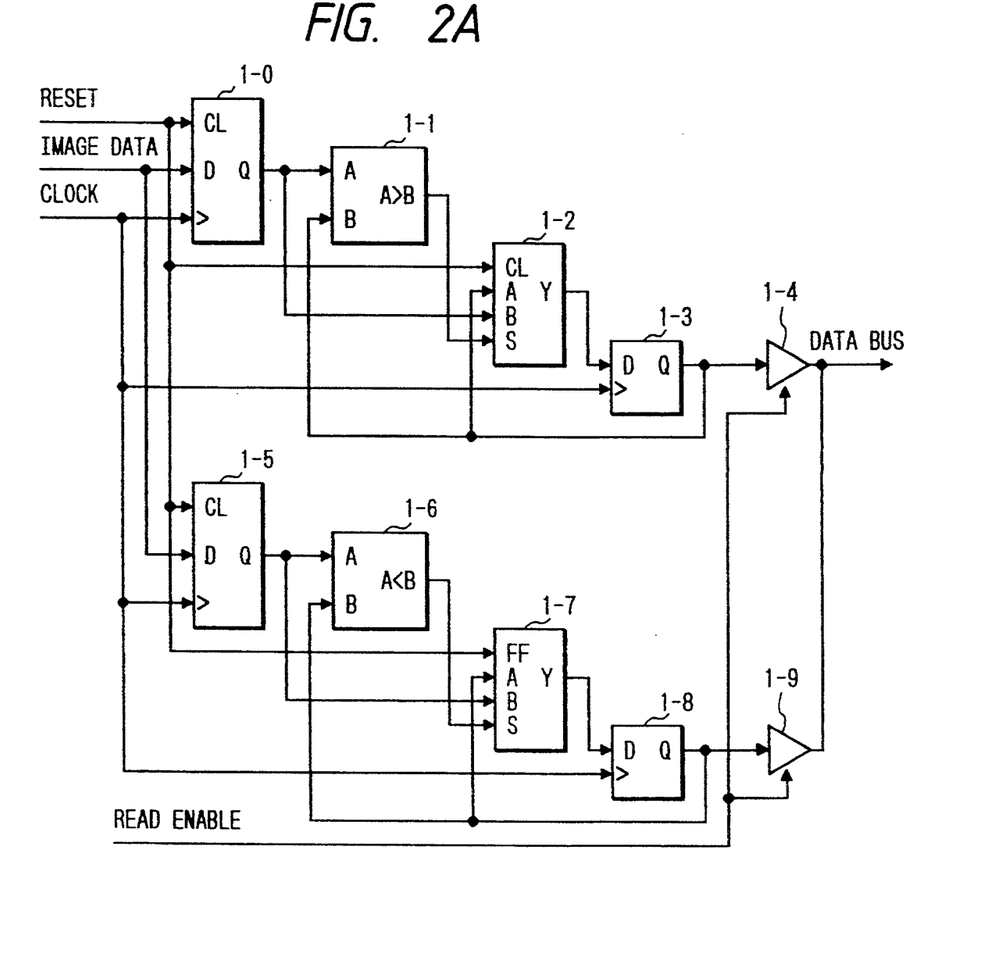
FIGS. 2A to 2C are diagrams for representing concrete examples of the circuit arrangement.
Figure 2B:
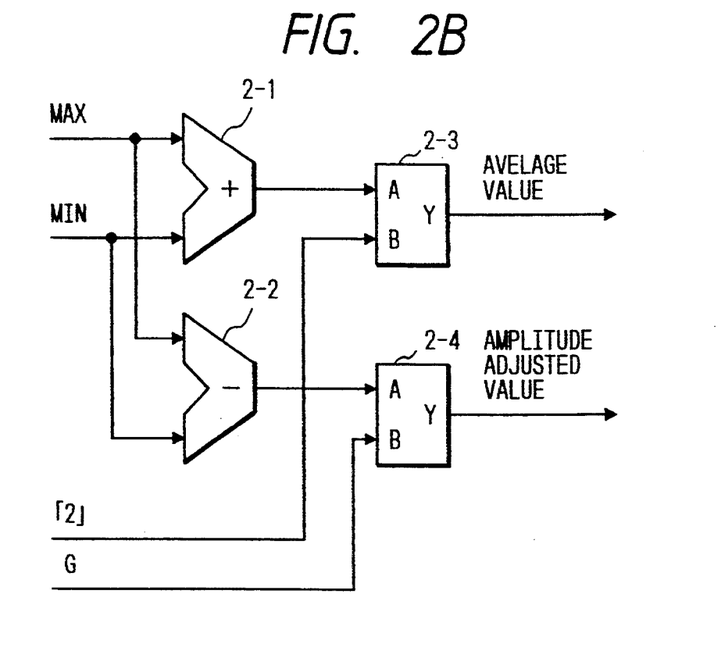
Figure 2C:
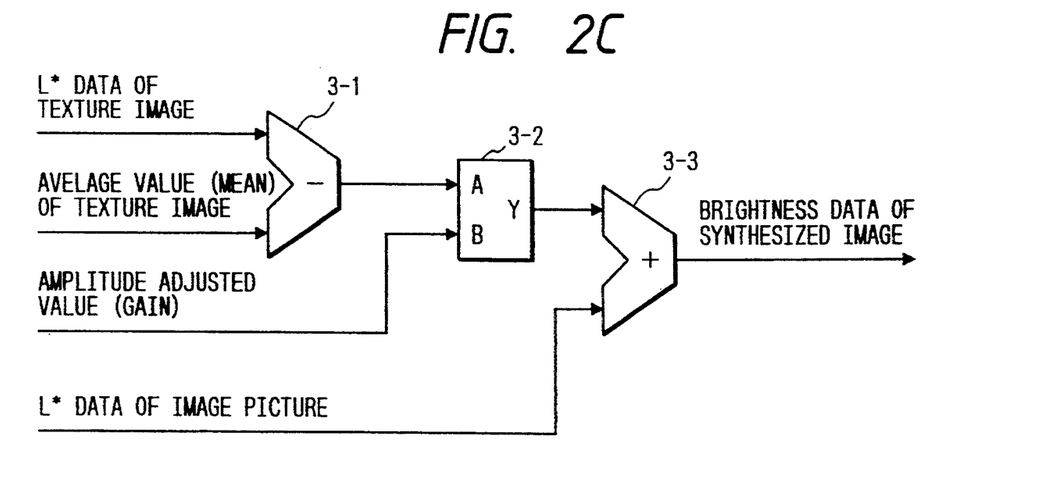

Referring now to drawings, embodiments of the present invention will be explained. FIG. 1 is an explanatory diagram of a texture image processing system for an image processing apparatus according to an embodiment of the present invention. FIGS. 2A to 2C are diagrams for showing a concrete example of a circuit arrangement. FIGS. 3A to 3D are explanatory diagrams of a synthesizing process.

In FIG. 1, a first calculating means 1 obtains a maximum value "Max" and a minimum value "Min" of texture image data "T", and a second calculating means 2 obtains both of an average value "Mean" [=(Max+-Min)/2] and a gain value "Gain" [(=G/(Max−Min)), where symbol "G" indicates an adjustable value which is set by a user] by using the maximum value and the minimum value. A synthesizing means 3 is to synthesize the texture image data "T" with image picture data "O", thereby obtaining synthesized image data by multiplying the difference between the texture image data and the average value by the gain value with use of the following calculation:

(T−Mean)×Gain+O

A concrete example of a circuit arrangement of the first calculating means 1 is shown in FIG. 2A. Flip-flop circuits 1-0, 1-5 latch input data, whereas flip-flop circuits 1-3, 1-8 latch the maximum value and the minimum value, respectively. The values latched in the respective flip-flop circuits 1-3, 1-8 are inputted into comparators 1-1, 1-6 and multiplexers 1-2, 1-7. In response to a reset signal, the multiplexer 1-2 outputs "00" which is latched by the flip-flop circuit 1-3, and is controlled by the output from the comparator 1-1 so as to select larger input data. Conversely, the multiplexer 1-7 outputs "FF" in response to a reset signal, which will then be latched by the flip-flop circuit 1-8, and is controlled by the output of the comparator 1-6 in order to select smaller input data. As a consequence, the flip-flop circuit 1-3 is updated by a value of inputted image data every time the value of the inputted image data is greater than the value latched by this flip-flop circuit 1-3. Conversely, the flip-flop circuit 1-8 is updated by a value of inputted image data every time the value of the inputted image data is smaller than the value latched by this flip-flop circuit 1-8, That is to say, the maximum value is detected by the flip-flop circuit 1-3, the minimum value is detected by the flip-flop circuit 1-8, and these values are read out to a data bus by controlling bus controllers 1-4 and 1-9 by a read enable.

A concrete example of a circuit arrangement of the second calculating means 2 is represented in FIG. 2B, which is so constructed that the average value "Mean" is obtained by calculating [(Max+Min)/2] by means of an adder 2-1 and a divider 2-3, and a gain value "Gain" is obtained by calculating [=G/(Max−Min)] by means of a subtracter 2-2 and a divider 2-4.

Figure 3A:
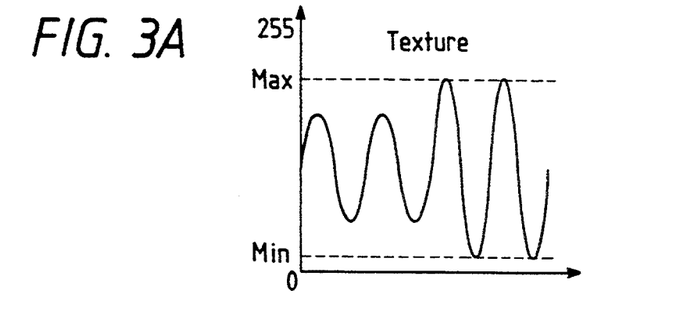
FIGS. 3A to 3D are explanatory diagrams of the synthesizing process.
Figure 3B:
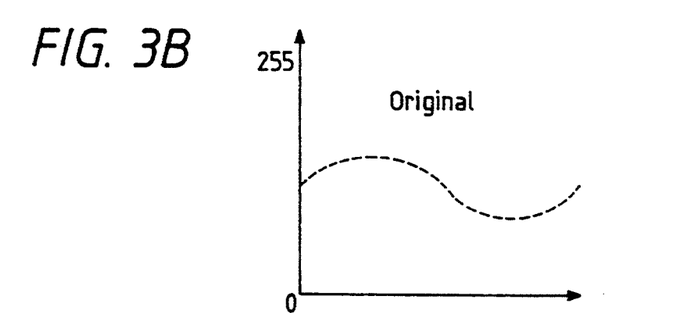
Figure 3C:
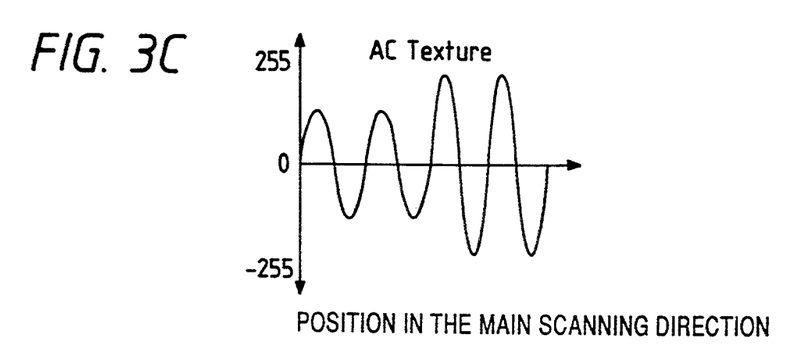
Figure 3D:
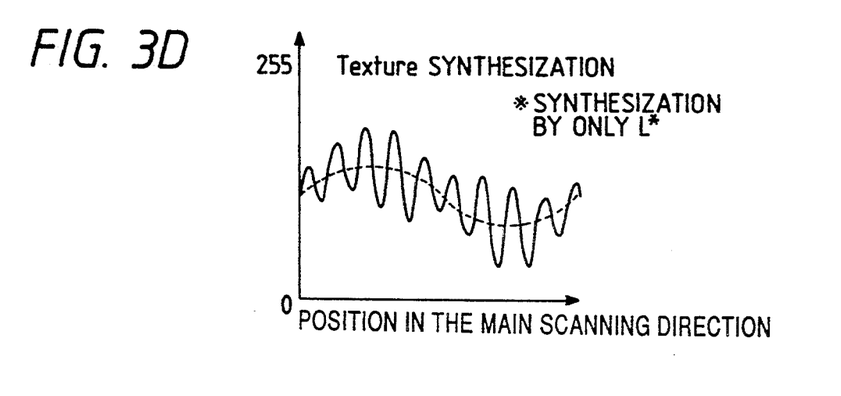

A concrete example of a circuit arrangement of the synthesizing means 3 is shown in FIG. 2C, and examples of signals thereof are shown in FIG. 3A to FIG. 3D. For instance, when there are texture image data "T" as shown in FIG. 3A and image picture data "O" as shown in FIG. 1, the average value "Mean" obtained by using the first calculating means 1 and the second calculating means 2 is subtracted from the texture image data "T" in the subtracter 3-1, whereby AC texture data as indicated by FIG. 3C is obtained. This AC texture data is multiplied by the gain value "Gain" in the multiplier 3-2, and furthermore the resultant data is synthesized with the image picture data "O" in the adder 3-3, whereby data on a synthesized image as shown in FIG. 3D is obtained.

When the above-described synthesizing process is performed only for a luminance signal (brightness signal), hue and saturation are reserved. Moreover, since the texture image is synthesized with respect to the brightness of the original image, the natural synthesized image without any large variations in the brightness of the entire images before and after the synthesization can be obtained, and also the strengths of the texture can be adjusted by controlling the gain (control of "G"). The brightness signal may be obtained by performing the matrix calculation in the color converting circuit, while the color separated signals B (blue), G (green) and R (red) having reflectivity read by the image reading means (IIT), for example, the CCD sensor, are converted into system values L*, a*, b* of equivalent color space. It should be noted that an L*-axis of the system value indicates brightness, and an a*-axis and a b*-axis which are positioned perpendicular to the L*-axis indicate saturation and hue, respectively, in a two-dimensional plane.

Figure 4A:
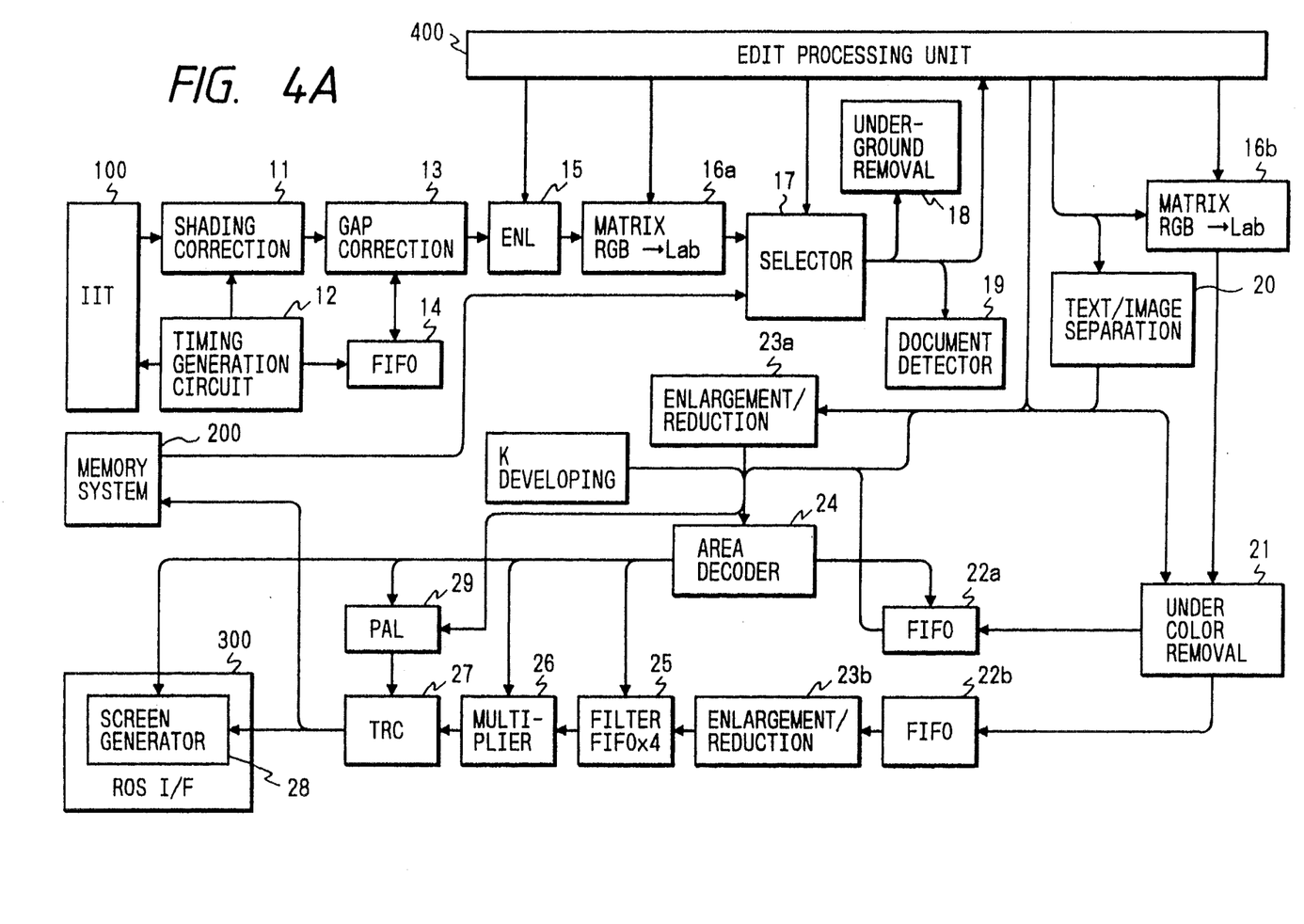
FIGS. 4A and 4B are diagrams for representing an example of the arrangement of the signal processing system for the image processing apparatus.
Figure 4B:
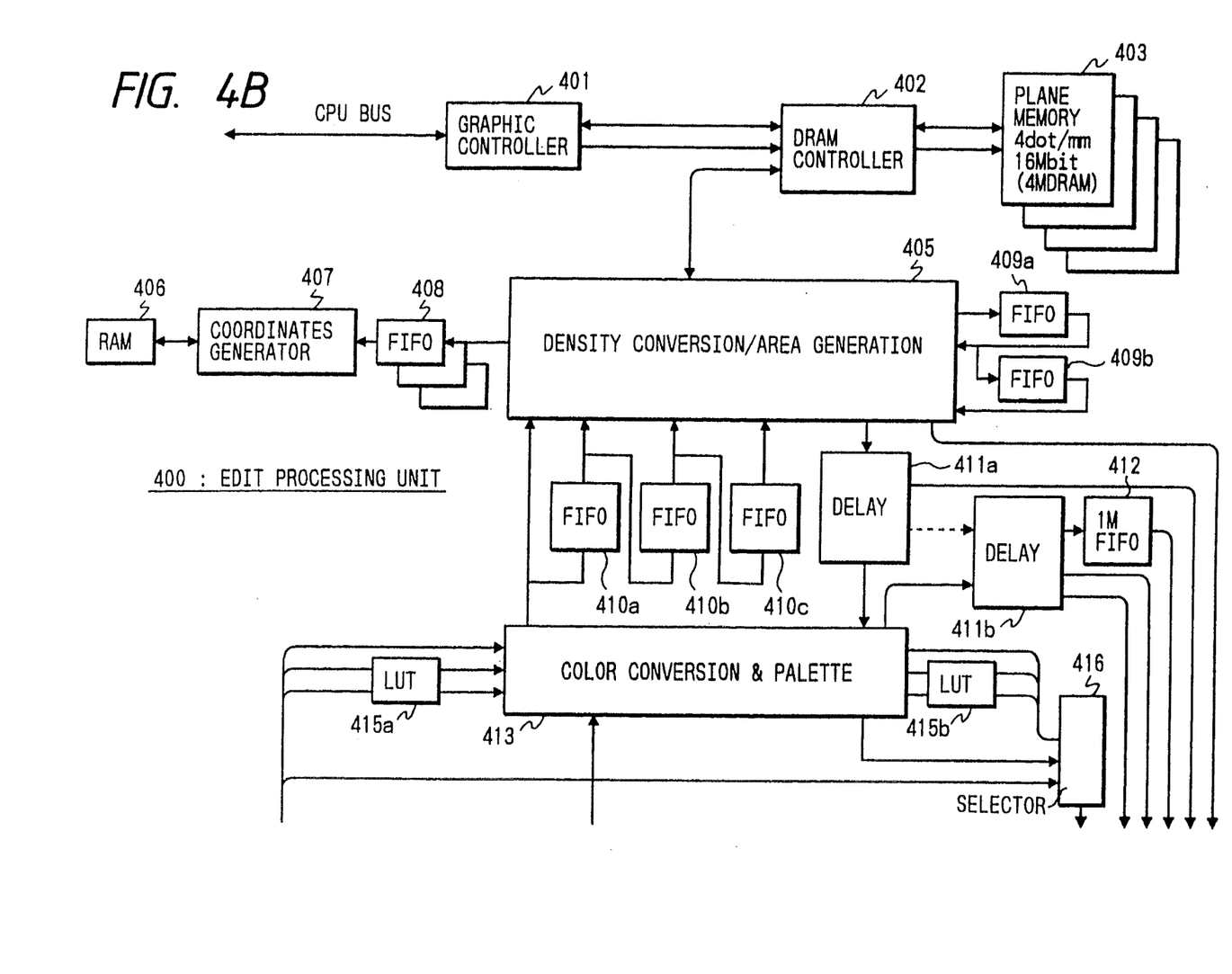
Figure 5:
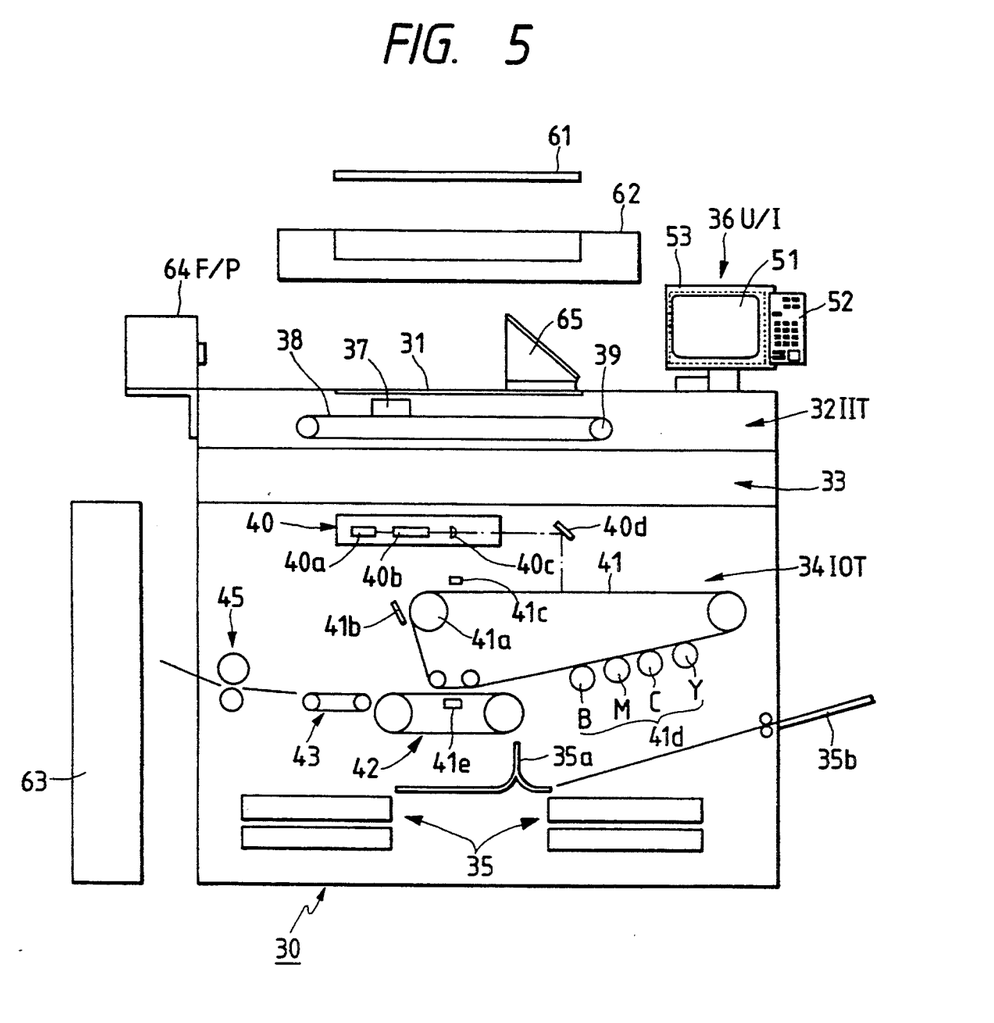
FIG. 5 is a diagram for showing an example of the arrangement of the mechanism of the image processing apparatus.

Next, there is shown an example of a construction of an image processing apparatus to which the above-described present invention is applied. FIGS. 4A and 4B are diagrams for showing a constructive example of a signal processing system for the image processing apparatus, and FIG. 5 is a constructive example of a mechanism of the image processing apparatus.

In FIG. 4, an image input unit 100 includes a compression type sensor arranged by, for instance, three CCD line sensors B, G and R positioned perpendicular to a vertical scanning direction, and corresponds to an IIT which performs an image reading operation by scanning an image along a main scanning direction in synchronism with a timing signal derived from a timing generation circuit while moving at a speed corresponding to the compression/enlargement magnification along the vertical scanning direction, whereby analog image data is converted into, for instance, 8-bit digital image data which has been represented by gradation. In a shading correction circuit 11, shading corrections are carried out for this digital image data with respect to fluctuations occurring in the respective pixels caused by various reasons. In a gap correcting circuit 13, gap corrections for gaps among these line sensors are performed. The gap correction is such that the read image data are delayed by the data corresponding to the gaps of the CCD line sensor in a FIFO (First-In-First-Out Structure Line Memory) 14, and thus the B, G, R image data at the same position can be obtained at the same time instant. An ENL (Equivalent Neutral Lightness) converting circuit executes the gray balance process for the image data by utilizing a parameter depending upon a type of an original, and also performs a negative/positive inverting operation by reversing the gray balance every pixel in response to a negative/positive signal from an edit processing unit 400 (discussed later), for instance, can invert a negative/positive relationship of only a certain designated region.

The B, G, R image data which have been processed in the ENL converting circuit 15 are converted in a matrix circuit 16a into, for example, equivalent color spatial signals L*, a* and b*. In coordinate axes positioned normal to each other, the equivalent color spatial signal L* indicates lightness (brightness), and the equivalent color spatial signals a* and b* represent a chromaticity plane (hue and saturation). Since the image data are converted into the equivalent color spatial signals L*, a* and b*, it can be readily interfaced with an external computer or the like via a memory system 200, and also the color conversion, the edit process as well as the detections of image information can be easily achieved. A selector 17 selectively derives an output from either a matrix converting circuit 16a, or the image data from the memory system 200 functioning as an interface with an external device, otherwise performing the processes of the texture synthesization and the transparent synthesizing process while acquiring both of these image data at the same time. As a result, this selector 17 has functions for setting a synthesization ratio, and for processing the calculation and the synthesization with regard to the synthesized image.

An under color removing circuit UCR 18 detects density of an under color by forming a histogram of an original's density by the prescanning operation, for instance, and improves a quality of a copy with respect to such a foggy original as a newspaper by skipping a pixel lower than the density of the under color. An original sensing circuit 19 senses a boundary between a rear surface of a black platen and the original and also detects a signal of this original by obtaining a circumscribed rectangle, and then stores this size of the original. In the under color removing circuit 18 and the original sensing circuit 19, the brightness information is employed as the equivalent color spatial signal L* among these spatial signals L*, a* and b*.

In an edit processing unit 400, an area command is set in order to change an edit process and a parameter for every region, and also a region control signal is generated in response to the area command, and then other processes such as the color edit, color conversion and marker color detection are performed with respect to the image data. Subsequently, the image data processed by the above-described process operations is inputted into a matrix converting circuit 16a and a text/image separating circuit (TIS circuit) 20.

With regard to the image data after the edit processing operation, the equivalent color spatial signals L*, a*, b* are converted into toner colors of Y, M, C in the matrix converting circuit 16a, and a plurality of pixels are blocked and the region discrimination of color text, black text or image pattern (character/half tone) is executed in the picture/character separating circuit 20. The under color removing circuit 21 outputs image data of full color by producing K(black) from the image data of Y, M, C converted in the matrix converting circuit 16b in response to the mono color/full color signals and by removing equivalent amounts of Y, M, C, and furthermore produces a hue signal by executing a hue judgement. It should be noted that when the discrimination process is carried out in the text/image separating circuit 20, since the region discriminating signal causes, for instance, 12 line delays in order to perform the blocking process, FIFO 22a and 22b are employed to set such timings that the hue signal is synchronized with the image data in order to compensate for this delay.

A enlargement/reduction circuit 23b performs a enlargement/reduction process in accordance with the enlargement/reduction ratio designated by the image data. Since the enlargement/reduction process is carried out in vertical scanning direction by varying the scanning speed in the image input unit 100 in accordance with the enlargement/reduction ratio, the image data are thinned out, or interpolated with respect to the horizontal scanning direction in this embodiment. The enlargement/reduction circuit 23a is employed so as to perform the enlargement/reduction process of the area command not to be out of the execution region of the region control information in accordance with the enlargement/reduction process for the image data. The region control information which has been enlargement/reduction processed is decoded by an area decoder 24, which will then be processed in accordance with the respective processing blocks. The area decoder 24 produces a parameter of a filter 25, a coefficient of a multiplier 26, and a parameter changing signal of a TRC circuit 27, and distributes them.

The filter 25 eliminates Moire' of a half tone and emphasizes an edge of a character with respect to the image data which has been reduced, or enlarged in the enlargement/reduction circuit 23b, depending upon a spatial frequency. The TRC circuit 27 adjusts density in conformity with the characteristic of the IOT with employment of a conversion table, and a PAL 29 corresponds to a decoder for changing the parameters of the conversion table of the TRC circuit 27 in response to signals of developing process and region discrimination. A multiplier 26 is to calculate (ax+b) with employment of coefficients "a" and "b" with regard to the image data "X". When the input image is a half-tone image having multigradations the conversion is considered "through" and the coefficient "a" is set to approximately 1. In the case of image data having high contrast, such as characters, the conversion is considered as "high $\gamma$" and the coefficient "a" is set to a number greater than 1. Then, in combination with the TRC circuit 27, the color adjustment and the density adjustment with respect to the color character, black character and picture pattern by properly selecting the coefficients and conversion tables for the respective color components. Also, the parameters of the filter 25 are standardized to adjust the edge enhancement of the character by the coefficients "a" and "b". These adjusted image data are stored into the memory system, or dot-expanded in the screen generating unit 28 of ROS (Raster Output Scanner) 300, whereby a dot image is outputted.

The edit processing unit 400, shown in FIG. 4B, performs the color conversion, the color edit, and the generation of the region control signal, into which the image data L*, a*, b* from the selector 17 are inputted. In an LUT 415a, saturation information is converted from a, b of the orthogonal coordinate system into C, H of the polar coordinate system in order that the color detection, color edit and color conversion for the marker color and other colors can be easily performed. In a color conversion & pallet 413, for instance, the colors used in the color conversion and color edit operation are stored in 32 sorts of pallets, and various processes such as the color detection, edit operation, and color conversion are performed with respect to the image data L, C, H in response to an area command inputted via a delay circuit 411a. Then, only after the image data about the region where the process, such as the color conversion is carried out, is processed in the color conversion & pallet 413, and also the image data is reverse-converted from C, H to a, b in the LUT 415b, the image data about any regions other that the first-mentioned region are directly outputted from the selector 416 and sent to the above-described matrix converting circuit 16b.

Both of the marker colors (3 different colors) detected from the image data in the color conversion & pallet 413 and also the 4-bit signal of the closed region are transferred to a density converting/region producing circuit 405. In the density converting/region producing circuit 405, the density conversion from 400 spi (spot per inch) to 100 spi is carried out by a 4×4 window with employment of the FIFOs 410a, 410b and 410c by executing such a binary coding process that if the quantity of black pixel among 16 pixels is greater than, or equal to a predetermined number, it is set to "1". Thus, the produced marker signals (closed loop and marker dots) are written from the density converting/region generating circuit 405 via a DRAM controller 402 to a plane memory 403.

The marker dot signal is delayed by 3 lines so as to avoid such an erroneous detection that small dirt is sensed as a marker by utilizing the FIFO 408, and then, the detection of marker dots and the generation of coordinate value are carried out in a coordinate value generating circuit 407 with a 3×3 window and thereafter stored into a RAM 406. It should be noted that although this marker dot is stored into the plane memory 403, this process is performed so as to avoid the erroneous detection.

The plane memory 403 is a memory to store the area commands for executing the color conversion, color edit operation, and edit operation of other regions. For instance, the region may be designated from an edit pad whereby the area command may be written into this region. That is to say, the area command of the region designated by the edit pad is transferred via a CPU bus to a graphic controller 401, and then is written from the graphic controller 401 via the DRAM controller 402 to the plane memory 403. The plane memory 403 is constructed of four planes, in which 16 sorts of area commands from "0" to "15" may be set.

The 4-bit area commands stored into the plane memory 403 are read out in synchronism with the outputs of the image data, and are used to change the parameters of the filter 25, multiplier 26, TRC circuit 27 and screen generating unit 28 via the image data process system, ENL converting circuit 15, matrix converting circuit 16, selector 17, under color removing circuit 21 and further the area decoder 24, and also perform the edit process at the color convention/pallet. When this area command is read out from the plane memory 403, and used to change the parameters in image data process system and to perform the edit process at the color conversion and pallet 413, the density conversion from 100 spi to 400 spi is required and this process is performed in a density converting/region generating circuit 405. In the density converting/region generating circuit 405, the density conversion from 100 spi to 400 spi is performed to prevent zigzag boundaries of the closed loop and the edit region by blocking the patterns by 3×3 with employment of the FIFOs 409a, 409b, whereby the interpolation is carried out from this pattern. Delay circuits 411a, 411b, and 1MFIFO 412 and the like are employed to performing a timing control between the area command and the image data.

The texture image process according to the present invention in the above-described system may control the selector 17 from, for instance, the image input unit 100 and the memory system 200, thereby acquiring the respective image picture data and the texture image data into the edit processing unit 400, so that such a texture image process may be effected in the color conversion and pallet 413.

A color copying machine, as shown in FIG. 5, is arranged around a base machine 30 and a film image reading apparatus functioning as an optional unit. This base machine 30 is constructed of a platen glass 31 having an upper plane on which an original is mounted; an image input terminal (IIT) 32, an electric system control storage unit 33, an image output terminal (IOT) 34, a paper tray 35, and a user interface (U/I) 36, whereas the film image reading apparatus is constructed of an edit pad 61, an auto-document feeder (ADF) 62, a sorter 63, a film projector (F/P) 64 and a mirror unit (M/U) 65.

The image input terminal 32 is constructed of an imaging unit 37, a wire 38 for driving it, and a drive pulley 39, and converts into multi-graded digital image data B, G, R, the image information of the color original which has been color-separated by a color filter employed within the imaging unit 37, into light primary colors B (blue), R (red) and G (green), and read out by employing the CCD line sensors, which will then be outputted into the image processing system. The image processing system is located in the electric system control storage unit 33, and performs various processes such as the conversions, correction processes and edit processes by inputting the image data of B, G, R in order to improve colors, gradation, definition, other image qualities and reproducibility. Furthermore, the image process system converts the image data into primary colors Y (yellow), M (magenta), C (cyan) and K (black) of the toner; and also converts the gradation toner signal of full color into ON/OFF binary toner signal which will then be outputted to an image output terminal 34. This image output terminal 34 includes a scanner 40 and a sensitive material 41. In a laser output unit 40a, the image data is converted into an optical signal; a latent image corresponding to an image of an original is formed via a polygon mirror 40b, F/θ lens 40c and a reflection mirror 40d onto a sensitive material belt 41; and this image is transferred to paper transported from the paper tray, whereby a color copy is delivered therefrom.

In the image output terminal 34, the photosensitive belt 41 is driven by the drive pulley 41a; a cleaner 41b, a charger 41c, developing devices 41d for the respective colors Y, M, C, K and a transfer device 41e are arranged around the sensitive belt 41; and a transfer apparatus 42 is positioned opposite to this transfer device 41e. Then, the paper which is transported from the paper tray 35 via the paper transporting path 35a is cached by the image output terminal 34, in case of a 4-full-color copy, after the transfer apparatus 42 is rotated 4 times and the respective latent images of Y, M, C, K are transferred to this paper, the transfer image of the resultant paper is supplied from the transfer unit 42 via a vacuum transport apparatus 43 to a fixer 45 and fixed in this fixer 45, which will then be ejected. An SSI (single sheet inserter) 35b is capable of selectively supplying paper into the paper transport path 35a by a manual mode.

The user interface 36 is to designate execution conditions, while a desirable function is selected by a user, and is equipped with a color display 51 and a control panel 52, and furthermore is combined with an infrared touch board 53, whereby a direct instruction is available by using a soft button displayed on a screen.

The electric system control storage unit 33 stores therein a plurality of control boards, an MCB board (machine control board, and an SYS control board. The plural control boards are separated into the above-described image input terminal 32, image output terminal 34, user interface 36, image process system and film projector and the like controls. The MCB board is to control mechanism operations of the image output terminal 34, auto-original feeding apparatus 62 and a sorter. Also, the SYS board controls the overall system.

It should be noted that the present invention is not limited to the above-described embodiments, but may be modified. For instance, although the texture image data are directly used to be synthesized with the image picture data in the above-explained embodiment, this texture image data may be alternatively synthesized with the image picture data after being grade-compressed. As a result, dependency to the texture image may be reduced. Also, predetermined chromaticity information may be combined with the chromaticity information of the image picture data, as one example, by combining the chromaticity information of the texture image data with the chromaticity information of the image picture data. Accordingly, a design of such an image whose under layer is colored may be simulated with having more realistic chromaticity feelings than that of the above-described case.

As explained above, in accordance with the present invention, since the average value is obtained from the maximum value and the minimum value of the texture image data, the gain is set, and is synthesized with the image picture data, the strengths of the texture may be controlled by way of the gain adjustment. Moreover, since the strengths of the texture are controlled based on the average value with respect to the brightness of the original image and then synthesized with the image picture data, there is no large variation in the brightness of the entire image before and after such an image synthesization, and thus a synthesized image with a natural atmosphere can be obtained. Also, as only the brightness signal is employed for the image synthesization, both of hue and saturation can be maintained. Since the synthesizing process operation is executed with the equivalent color spatial signal, this synthesizing process operation can be completely independently performed from those of the image reading apparatus and other apparatuses. Furthermore, the monochromatic image synthesization may be performed similar to the color image synthesization.

What is claimed is:

1. A texture image processing system for an image processing apparatus in which a texture image is combined with an input image, the system comprising:
   means for reading the input image and creating image data;
   means for separating the image data into color data;
   first converting means for converting the color data into equivalent color spatial signals;
   second converting means for converting the equivalent color spatial signals into color material signals, and including:
      first calculating means for calculating a maximum value and a minimum value of texture image data;
      second calculating means for calculating an average value of said maximum value and minimum value and a gain value with employment of said maximum value and minimum value; and
      synthesizing process means for synthesizing texture image data by image picture data, said synthesizing process means synthesizing the texture image data with the image picture data by multiplying a difference between the texture image data and the average value by the gain value and then adding the input image data; and
   output means, responsive to the color material signals, for outputting the synthesized texture image.

2. A texture image processing system as claimed in claim 1, wherein said synthesizing process means synthesizes the texture image data with brightness information of the image picture data.

3. A texture image processing system as claimed in claim 1, wherein said synthesizing process means synthesizes the chromaticity information of the texture image data with the chromaticity information of the image picture data.

4. A texture image processing system for an image processing apparatus in which a texture image is combined with an input image, the system comprising:
   means for reading the input image and creating image data;
   means for separating the image data into color data;
   first converting means for converting the color data into equivalent color spatial signals;
   second converting means for converting the equivalent color spatial signals into color material signals, and including:
      first calculating means for calculating a maximum value and a minimum value of texture image data;
      second calculating means for calculating an average value of said maximum value and minimum value and a gain value with employment of said maximum value and minimum value; and synthesizing process means for synthesizing texture image data by image picture data, said synthesizing process means synthesizing the texture image data with the image picture data by multiplying a difference between the texture image data and the average value by the gain value;

third calculating means for converting the synthesized texture image into color material signals; and output means, responsive to the color material signals, for outputting the synthesized texture image.

* * * * *